May 8, 1945.  A. DE L. SINDEN  2,375,697
CONVEYER
Original Filed March 2, 1940

INVENTOR
ALFRED DE LOS SINDEN
BY
ATTORNEY

Patented May 8, 1945

2,375,697

UNITED STATES PATENT OFFICE 2,375,697

CONVEYER

Alfred De Los Sinden, Aurora, Ill., assignor to Redler Conveyor Company, Quincy, Mass., a corporation of Massachusetts Original application March 2, 1940, Serial No. 321,968, now Patent No. 2,281,026, dated April 28, 1942. Divided and this application January 19, 1942, Serial No. 427,307

1 Claim. (Cl. 198—52)

This invention relates to a conveyer for conveying flowable solid material.

The object of the invention is to provide a novel and improved construction of conveyer which finds particular use in conveying lumpy materials and with which the liability of jamming the conveyer and injuring the component parts thereof is reduced to a minimum.

With this general object in view, and such others as may hereinafter appear, the invention consists in the conveyer and in the various structures, arrangements and combinations of parts hereinafter described and particularly defined in the claim at the end of this specification.

Figure 1:
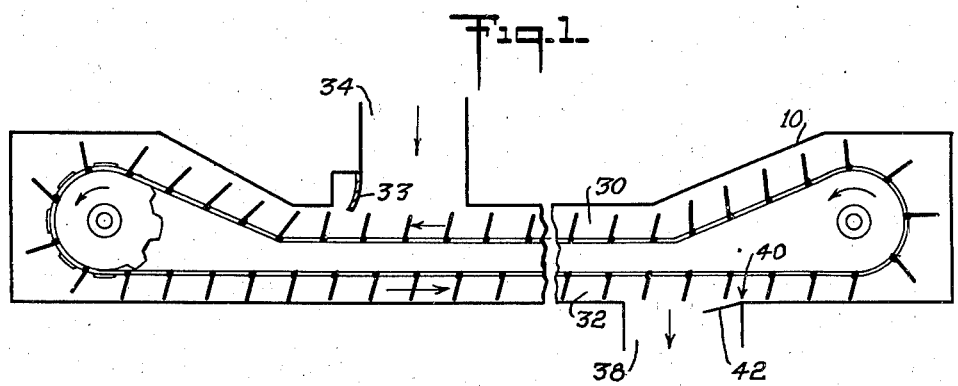
Figure 2:
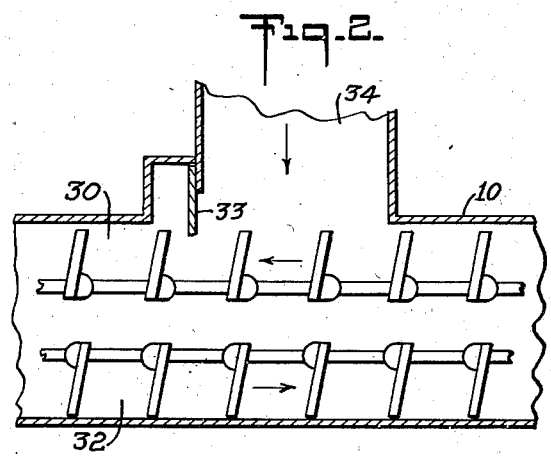
Figure 3:
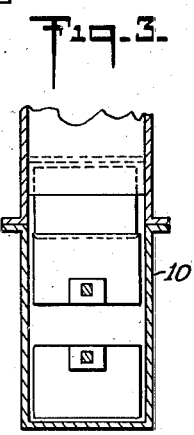

In the drawing, Fig. 1 is a side elevation illustrating a conveyer embodying the present invention; Fig. 2 is an enlarged detail of the inlet portion of the conveyer shown in Fig. 1; Fig. 3 is a cross-section of the conveyer shown in Fig. 2; and Figs. 4 and 5 are views similar to Figs. 2 and 3 illustrating a conveyer embodying a conveying element of the open flight type.

Prior to the present invention substantial difficulty has been encountered in handling certain types of lumpy flowable material in conveyers of the type embodying an elongated casing and a conveying element having spaced flights adapted to be drawn therethrough. Among such material may be mentioned crushed stone, coal, and other material containing lumps of a hardness such that, when wedged between the flights of the conveyer and the sharp edge of the conveyer casing forming the rear edge of the inlet or discharge opening therein, the flights oftentimes become broken or bent, or the conveyer stalled and rendered inoperative. The present invention contemplates novel and improved structures of the conveyer at the inlet and discharge sections thereof and different features of the invention find particular use in conveyers of the open flight type such as form the subject matter of the Redler United States Reissue Patent No. 18,445, while other features of the invention are particularly useful in connection with conveyers of the solid flight type, such for example as illustrated in the United States patent to White No. 2,066,866.

In Figs. 1, 2 and 3, I have illustrated a conveyer of the solid flight type, such for example as is illustrated in the White patent above referred to. As illustrated in detail in Figs. 2 and 3, this type of conveyer may and preferably will be provided with two runs 30, 32 of the conveyer element arranged to pass one above the other. The space between the flights immediately below the inlet opening 34 in the conveyer casing 10 is intentionally free from obstructions so as to permit the lumpy material to fall through the upper run 30 between adjacent flight members and to pass into the lower portion of the casing to be conveyed by the lower run 32 of the conveying element to the discharge opening in the casing. A yieldable flap 33 is preferably provided at the rear edge of the inlet opening in the top wall of the casing to assist in preventing jamming at this point. The flap member 33 is preferably formed as an extension of one wall of the inlet at the rear edge thereof and the conveyer casing is formed to provide a space beyond the flap member to enable the flap member to readily yield as a lump is forced against it by the operation of the conveyer flights and to thereby permit the lump to readily fall downwardly between the flights and prevent jamming of the conveyer.

Figure 4:
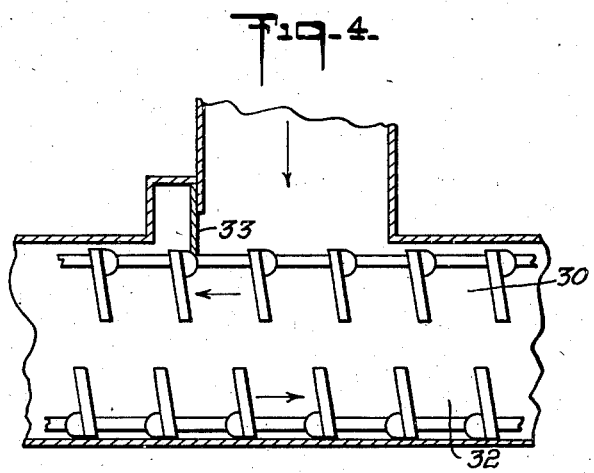
Figure 5:
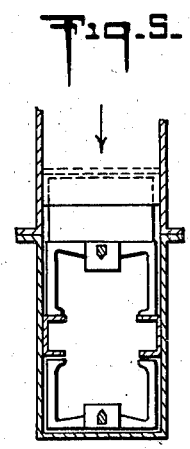

In Figs. 4 and 5 I have illustrated a modified form of conveyer embodying the invention and which is provided with a conveying element having upper and lower runs 30, 32 and having open flights herein shown as of general U-shape. The inlet of the conveyer is provided with a similar flap 33 formed as an extension of the rear wall of the conveyer inlet and the conveyer casing is shaped to provide a space beyond the flap member so as to enable the flap to readily yield as a lump is forced against it and thereby permit the lump to pass downwardly between the flights of the upper run of the conveyer.

This application is a division of my co-pending application, Serial No. 321,968, filed March 2, 1940 and issued April 28, 1942, as Patent No. 2,281,026.

Having thus described the invention, what is claimed is:

In a conveyer for conveying lumpy material, in combination, a casing having an inlet in the top wall thereof and a yieldable flap member forming an extension of one wall of the inlet at the rear edge thereof, the casing being formed to provide a space beyond said flap member, an endless conveyer elements having flights arranged to be drawn through the casing in upper and lower runs, said lower run comprising the active conveying run, the interior of said casing in the immediate vicinity of said inlet being unobstructed except for said upper and lower runs of the conveyer, whereby to permit lumpy material to fall freely through the upper run and between the flights thereof into a position to be conveyed by the lower run of the conveyer to thereby prevent bending and breakage of said upright flights.

ALFRED DE LOS SINDEN.